(12) United States Patent
Moon (10) Patent No.: US 6,188,461 B1
(45) Date of Patent: *Feb. 13, 2001

(54) METHOD FOR MANUFACTURING A LIQUID CRYSTAL DISPLAY UTILIZING AN ETCHING END POINT DETECTION PART IN A NON-DISPLAY AREA OF THE SUBSTRATE

(75) Inventor: Kyo Ho Moon, Kyungsangbook-do (KR)

(73) Assignee: L.G. Philips LCD Co., Ltd., Seoul (KR)

( * ) Notice: Under 35 U.S.C. 154(b), the term of this patent shall be extended for 0 days.

This patent is subject to a terminal disclaimer.

(21) Appl. No.: 09/449,479

(22) Filed: Nov. 29, 1999

Related U.S. Application Data

(63) Continuation of application No. 09/086,494, filed on May 29, 1998, now Pat. No. 6,023,319.

(30) Foreign Application Priority Data

Oct. 24, 1997 (KR) .................................................. 97-54962

(51) Int. Cl.⁷ .............................. G02F 1/13; C30B 33/00; C03C 15/00; G01L 21/30
(52) U.S. Cl. ........................... 349/187; 349/192; 216/23; 216/58; 216/72; 216/59; 438/30; 438/158; 438/689
(58) Field of Search ................................... 349/187, 192; 216/23, 39, 61, 72, 58, 59; 438/30, 158, 689

(56) References Cited

U.S. PATENT DOCUMENTS

| | | | |
|---|---|---|---|
| 4,246,060 | * 1/1981 | Keller | 216/61 |
| 5,308,447 | * 5/1994 | Lewis et al. | 156/626 |
| 5,318,667 | * 6/1994 | Kumihashi et al. | 216/61 |
| 5,702,567 | * 12/1997 | Mitsui et al. | 156/644.1 |
| 5,738,756 | * 4/1998 | Liu | 156/627.1 |
| 5,747,380 | * 5/1998 | Yu et al. | 438/599 |
| 5,792,673 | * 8/1998 | Nagura | 438/7 |
| 5,891,352 | * 4/1999 | Litvak | 216/85 |
| 6,023,319 | * 2/2000 | Moon | 349/187 |

* cited by examiner

Primary Examiner—William L. Sikes
Assistant Examiner—Quynh-Nhu Vu
(74) Attorney, Agent, or Firm—Morgan, Lewis & Bockius LLP

(57) ABSTRACT

A method for manufacturing a device includes the steps of forming a layer on a substrate and patterning an etching end point detection area in the layer in accordance with a designed pattern including an etching end point detection part.

11 Claims, 7 Drawing Sheets

METHOD FOR MANUFACTURING A LIQUID CRYSTAL DISPLAY UTILIZING AN ETCHING END POINT DETECTION PART IN A NON-DISPLAY AREA OF THE SUBSTRATE

This is a continuation of application Ser. No. 09/086,494 filed May 29, 1998, now U.S. Pat. No. 6,023,319.

This application claims the benefit of Korean Application No. P97-54962, filed in Korea on Oct. 24, 1997, which is hereby incorporated by reference.

BACKGROUND OF THE INVENTION

1. Field of the Invention The present invention relates to a method for manufacturing a liquid crystal display (or "LCD") device including a thin film transistor (or "TFT"). More particularly, the present invention relates to a method for etching a panel of an LCD in which the end point of the etching period is exactly detected so that an etched layer is not over-etched.

2. Discussion of Related Art

Figure 1:
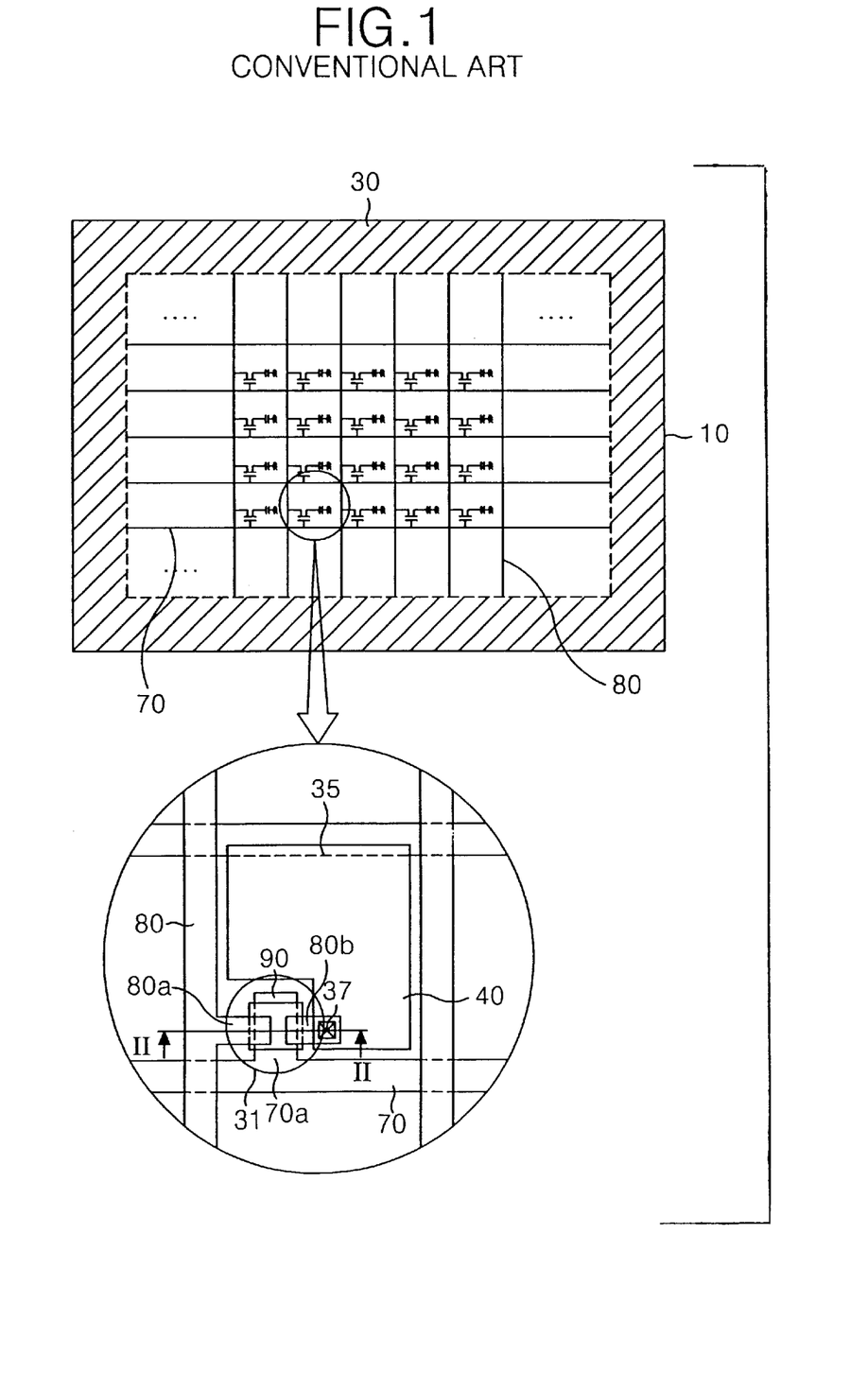
FIG. 1 is a plan view showing the conventional liquid crystal display device.
Figure 2:
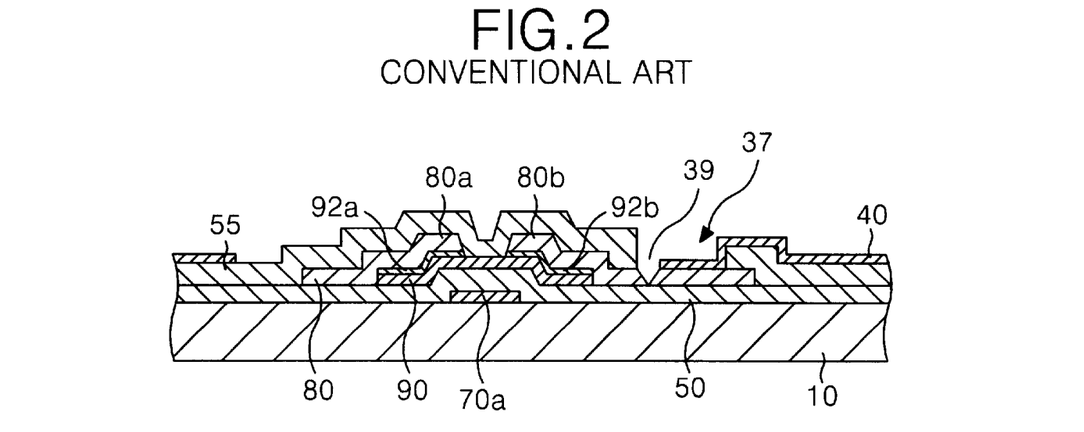
FIG. 2 is a cross sectional view showing the conventional liquid crystal display device.

Referring to FIG. 1, showing a conventional LCD arrangement, and FIG. 2, showing the cross sectional view along with the reference line II—II in FIG. 1, the conventional LCD comprises a plurality of gate lines 70 on a substrate 10 and a plurality of data lines 80. The gate lines 70 and the data lines 80 intersect each other in a substantially perpendicular arrangement to form an LCD matrix. The LCD further comprises a pixel electrode 40 at each area in the matrix surrounded by two neighboring gate lines 70 and two neighboring data lines 80. A TFT 31 is provided connected to the pixel electrode 40 at the intersection portion of one gate line 70 and one data line 80. An overlapped portion of the pixel electrode 40 and the gate line 70 is a storage capacitance electrode 35.

The TFT 31 comprises a gate electrode 70a extruded from the gate line 70, a source electrode 80a extruded from the data line 80, and a drain electrode 80b which faces the source electrode 80a. The TFT 31 further comprises a semiconductor layer 90 over the gate electrode 70a on a gate insulation layer 50 covering the gate line 70 and the gate electrode 70a. The semiconductor layer 90 is in contact with the source electrode 80a and the drain electrode 80b. In order to ohmically contact the source 80a and the drain 80b electrodes with the semiconductor layer 90, doped semiconductor layers 92a and 92b are formed under the source electrode 80a and the drain electrode 80b, respectively.

The LCD also includes a protection layer 55 covering the whole surface of the substrate 10, which includes a TFT 31, a contact hole 37 which exposes a portion of the drain electrode 80b by etching the protection layer 55, and the pixel electrode 40 coupled to the drain electrode 80b through the contact hole 37. If the duration of the etching process on the protection layer 55 when the contact hole 37 is formed lasts longer than a desired interval, then the resulting contact hole is larger than the initially desired size. As a result, the pixel electrode 40 does not cover the contact hole 37 entirely and leaves exposed a portion of the drain electrode 80b. This situation allows the exposed portion of the drain electrode 80b to be in contact with moisture and oxygen in the atmosphere. As a result, the drain electrode 80b can be corroded and short circuited, as shown in FIG. 2.

Figure 3A:
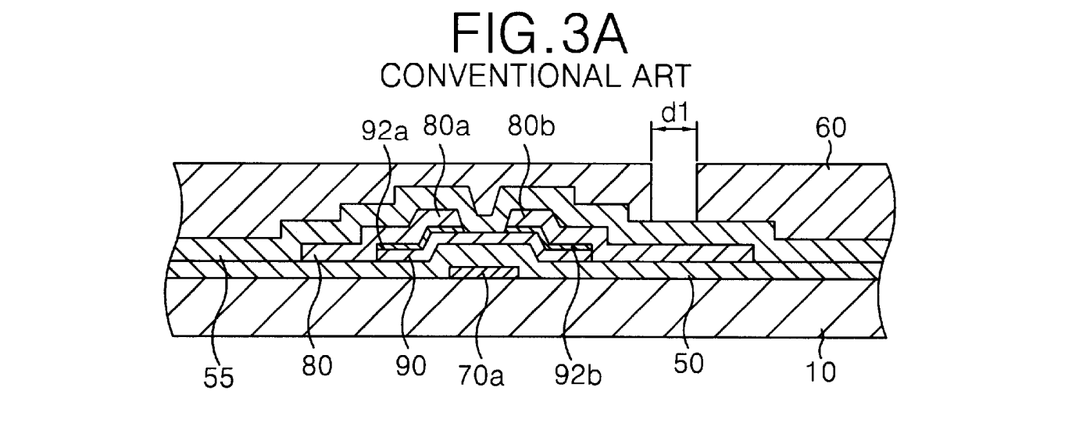
FIGS. 3A and 3B are cross sectional views showing the manufacturing steps for a liquid crystal display device according to the conventional method.
Figure 3B:
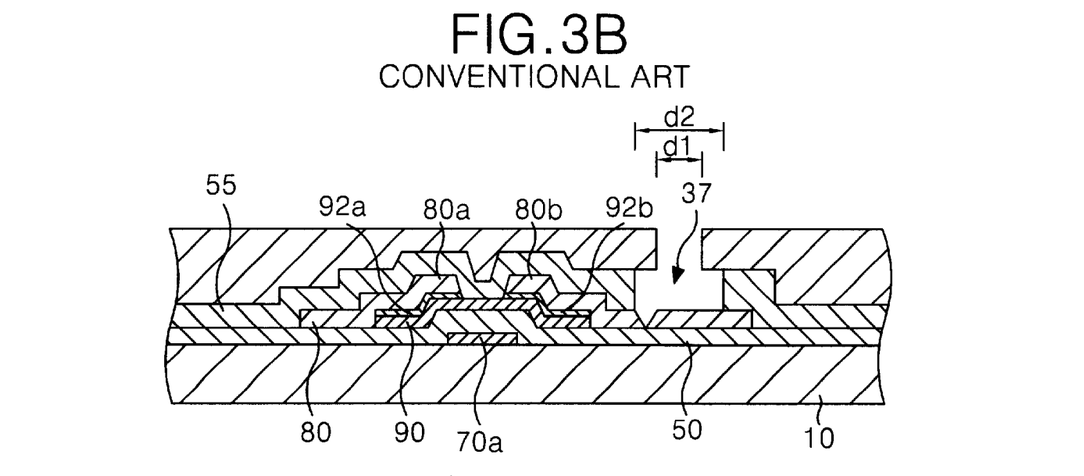

In order to understand why the contact hole is over-etched, we will explain the processing for manufacturing the LCD in detail with reference to FIGS. 3A and 3B.

As seen in FIG. 3A, a gate electrode 70a including aluminum or an aluminum alloy is formed on a transparent substrate 10. A gate insulating layer 50 including a silicon nitride ($SiN_x$) or a silicon oxide ($SiO_x$) is deposited on the substrate 10 covering the gate electrode 70a. A semiconductor layer 90 is formed on the gate insulation layer 50 over the gate electrode 70a. Two doped semiconductor layers 92a and 92b are formed on the two sides of the semiconductor layer 90. A data line 80 including a chromium material is formed on the gate insulation layer 50. A source electrode 80a extruding from the data line 80 is formed on the doped semiconductor layer 92a. A drain electrode 80b facing the source electrode 80a is formed on the doped semiconductor layer 92b. After the TFT including the source 80a and drain 80b electrode is formed, a protection layer 55 including an Si bonding structure such as a silicon nitride, a silicon oxide, or a benzocyclobutene (or "BCB") is formed on the substrate including the TFT. A photoresist is coated on the protection layer 55 using a spin coating method. The photoresist is exposed and developed using a mask to form a pattern layer 60 in which a portion having a scale d1 is removed from the photo resist.

After the panel of the LCD, as seen in FIG. 3A, is placed in an etching chamber, the exposed portion of the protection layer 55 is removed using $SF_6$ gas as an etchant. When the etchant is in contact with the surface of the protection layer 55, the $SF_6$ gas reacts with the Si radical of the protection later 55, so that the exposed portion of the protection layer 55 is removed from the surface while producing a volatile material such as an $SiF_4$ gas. After the exposed portion of the protection layer 55 is entirely removed, the surface of the drain electrode 80b is revealed. At that time, the amount of $SiF_4$ gas produced is decreased conspicuously. In other words, when the $SiF_4$ gas is being produced, the etching process is proceeding. The conspicuous reduction in the production of $SiF_4$ gas is an indication that the etching process is ended. We can determine the time that the optimum etching duration end point is reached by monitoring the amount of the $SiF_4$ gas produced.

Figure 4:
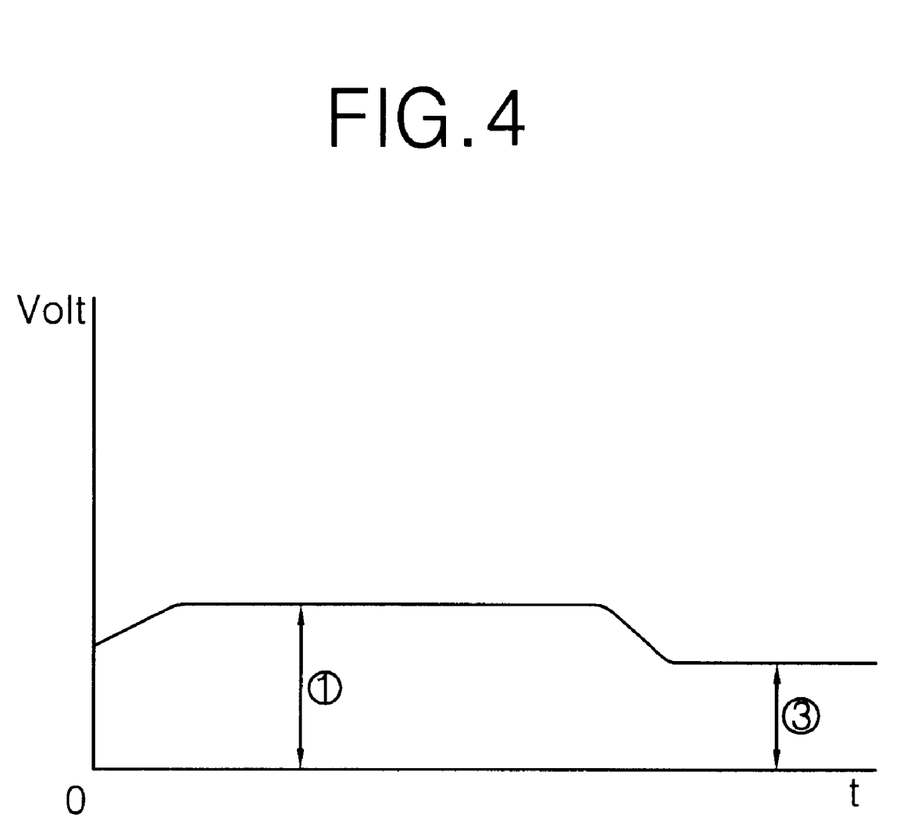
FIG. 4 is a voltage-time graph in which the etching end point is detected according to the conventional method.

However, despite the hundreds of thousands of the contact holes 37 present in the arrangement, the total area of the exposed portion of the protection layer is less than 1% of the total area of the panel, because the plane view area of the contact hole is less than tens of $\mu m^2$. Therefore, it is difficult to detect the etching duration end point exactly using the small amount of the $SiF_4$ gas reproduced from this tiny area. For example, in this method for detecting the $SiF_4$ gas, an electrical device, referred to as an etching end point detector, in which the amount of the $SiF_4$ gas produced is converted to electrical voltage according to the time duration is used. As seen in FIG. 4, the difference between the indicated voltage (1) during the time that the etching process is proceeding and the indicated voltage (3) during the time that the etching process is finished is difficult to distinguish because of the relatively slight difference between the two voltage levels. This results in difficultly in determining the exact duration of the etching period and the proper end point for the etching. By not determining the exact desired end time of the etching process, generally, the etching process continues after the desired end time is passed, resulting in the protection layer 55 being over-etched so that the contact hole has a d2 scale instead of the desired d1 scale as shown in FIG. 3B.

At this time, the pattern layer 60 is removed and an indium tin oxide (or "ITO") layer is deposited on the protection layer 55. The ITO layer is patterned to form a pixel electrode 40. In this case, the drain electrode 80b is not entirely covered by the pixel electrode 40. The drain electrode 80b is exposed through the contact hole 37 enlarged by the over-etch, as seen in FIG. 2. The exposed portion of the drain electrode 80b contacts with moisture and the oxygen in the atmosphere. As a result, the drain electrode 80b can corrode and finally it can be opened to form a short circuit.

The foregoing discussion describes the over-etch problem of the contact hole formed at the protection layer. A similar problem may result when a metal layer is etched to form a gate or data line, or when a semiconductor layer is formed.

SUMMARY OF THE INVENTION

Accordingly, the present invention is directed to a method for manufacturing a device that substantially obviates one or more of the problems due to limitations and disadvantages of the related art.

An object of the present invention is to provide a method for detecting an etching duration end point of an inorganic or an organic layer deposited on a substrate, which is patterned using photolithography.

Another object of the present invention is to control an etching process so that an etched layer is not over-etched.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for manufacturing a device includes the steps of forming a layer on a substrate and patterning an etching end point detection area in the layer in accordance with a designed pattern including an etching end point detection part.

In another aspect, the method for manufacturing a device includes the steps of forming a first layer on a substrate; forming a second layer on the first layer; and patterning an etching end point detection area in the second layer in accordance with a designed pattern including an etching end point detection part until the first layer is exposed through the etching end point detection area.

In another aspect, the method for manufacturing a liquid crystal display device includes the steps of dividing a substrate into a display area and a non-display area; forming a switching element including an output electrode in the display area; disposing a protection layer on the whole substrate including the switching element and the non-splay area; and etching the protection layer to form a contact hole in the display area exposing the output electrode and to form an etching end point detection area in accordance with an etching end point detection part in the non-display area In another aspect, the method for manufacturing a panel for a liquid crystal display device includes the steps of dividing a substrate of the liquid crystal display into a display area and a non-display area; forming a switching element including an output electrode at the display area on the substrate; depositing a protection layer on the substrate over the display area and the non-display area; etching the protection layer to form a contact hole in the display area exposing a part of the output electrode and to form an etching end point detection area in the non-display area by etching the protection layer in accordance with an etching end point detection part.

In a further aspect, a method of detecting an etching end point in a manufacturing method of a device includes the steps of forming a first layer on a substrate; forming a second layer on the first layer; and patterning an etching end point detection area in the second layer in accordance with a designed pattern including an etching end point detection part until the first layer is exposed through the etching end point detection area It is to be understood that both the foregoing general description and the following detailed description are exemplary and explanatory and are intended to provide further explanation of the invention as claimed.

BRIEF DESCRIPTION OF THE DRAWINGS

The attached drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
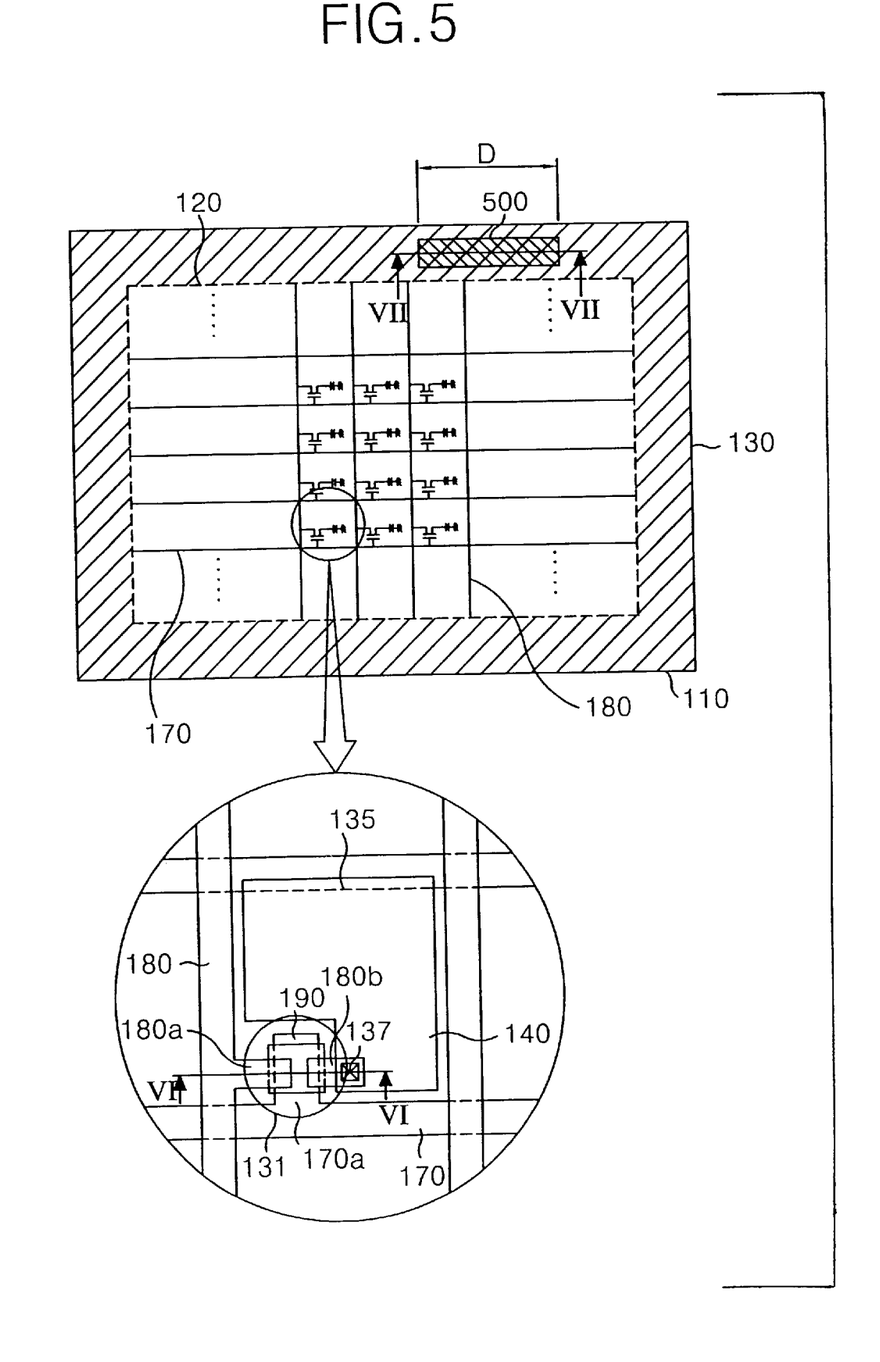
FIG. 5 is a plan view showing a liquid crystal display device according to the present invention.

As illustrated in FIG. 5, an LCD panel of the instant invention comprises a display area 120 which is surrounded by a dashed line as well as a non-display area 130 which is indicated by hatched diagonal lines. The display area 120 includes gate lines 170 and data lines 180 which are disposed in a matrix arrangement on a transparent substrate 110. At the intersection portion of the respective gate lines 170 and data lines 180, a TFT 131 is formed. The TFT 131 includes a gate electrode 170a connected to the gate line 170, a source electrode 180a connected to the data line 180 and a drain electrode 180b. At an area surrounded by two neighboring gate lines 170 and two neighboring data lines 180, a pixel electrode 140 is disposed. The pixel electrode 140 connects to the drain electrode 180b of the TEFT 131. Although not shown in FIG. 5, a protection layer covers the whole surface of the LCD panel including the display area 120 and the nondisplay area 130.

Figure 7A:
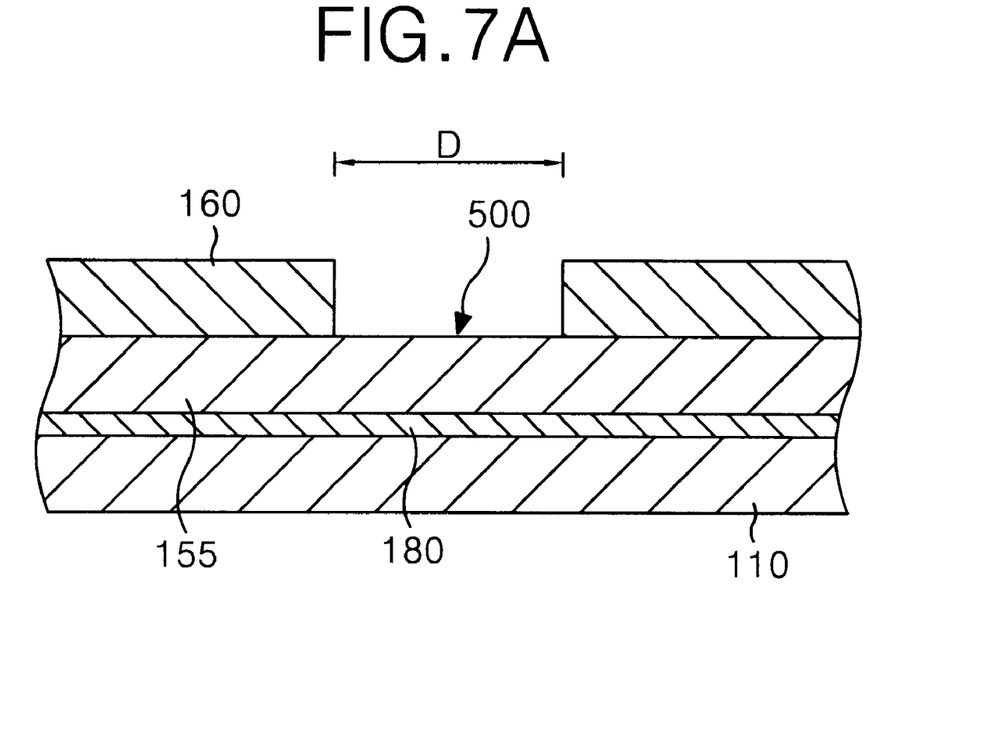
FIGS. 7A and 7B are cross sectional views of an etching end point detection part according to the present invention.
Figure 7B:
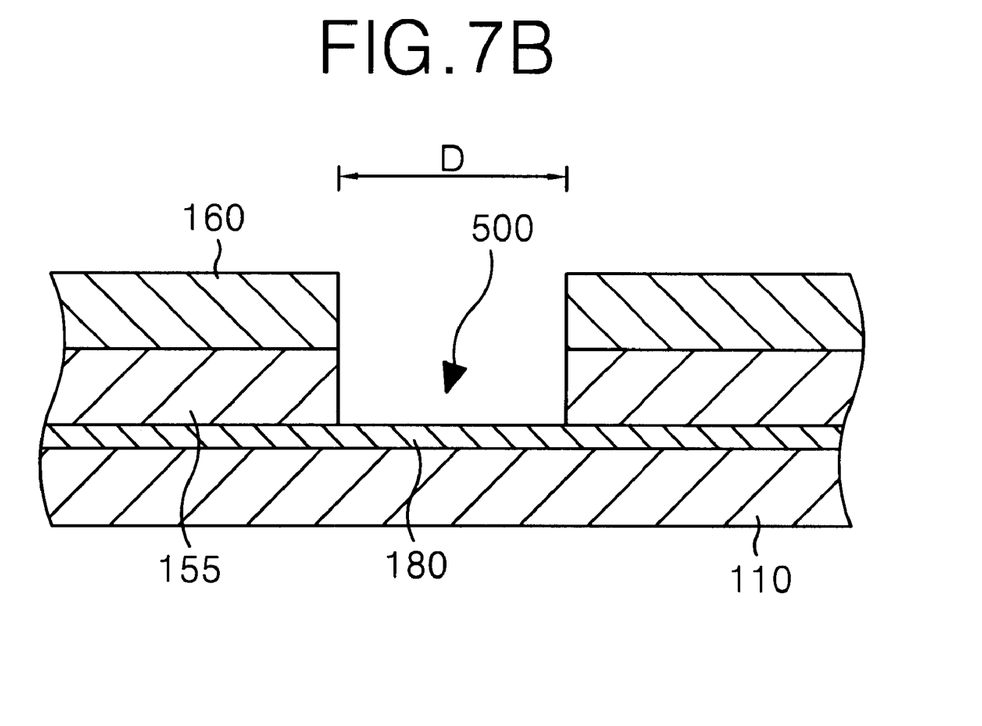
Figure 8:
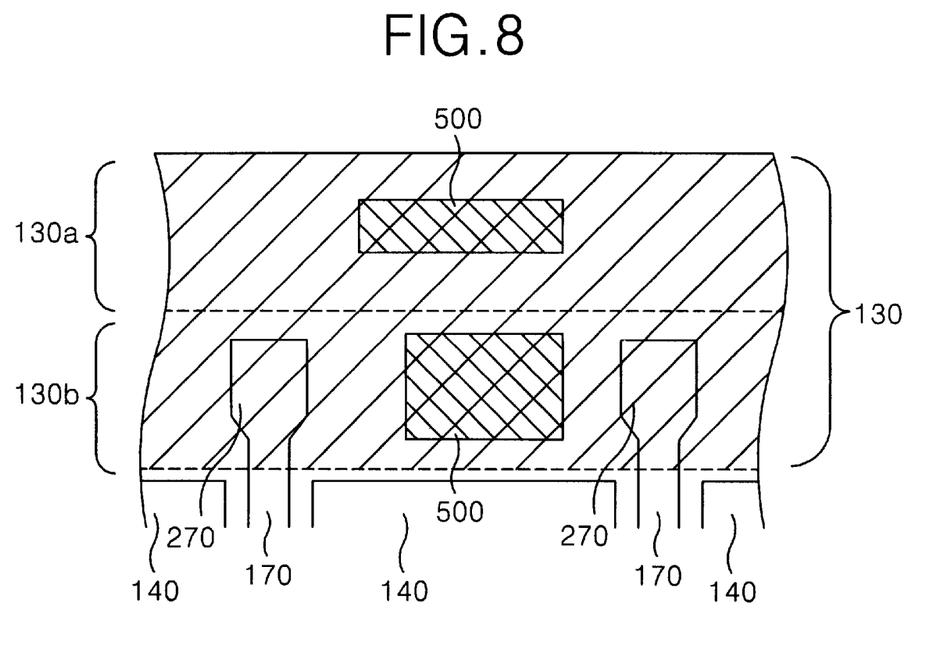
FIG. 8 is an enlarged plan view showing a liquid crystal display device having an etching end point detection part according to the present invention.

At the protection layer 155, a contact hole 137 is arranged exposing some surface of the drain electrode 180b. Also, at least one etching end point detection part 500 is arranged at the non-display area 130, as seen in FIGS. 7 and 8. It is preferable that the total area of the etching end detection part 500 is about 1% to 2% of the whole surface area of the substrate 110. Therefore, the width D of the etching end point detection part would be about several cm.

Further referring to FIGS. 6A–6C, the cross sectional views along with the reference line VI—VI in FIG. 5, and FIGS. 7A and 7B, the cross sectional views along with the reference line VII—VII in FIG. 5, the manufacturing and etching process of the LCD panel using the designed etching end point detection part 500 will be described.

Figure 6A:
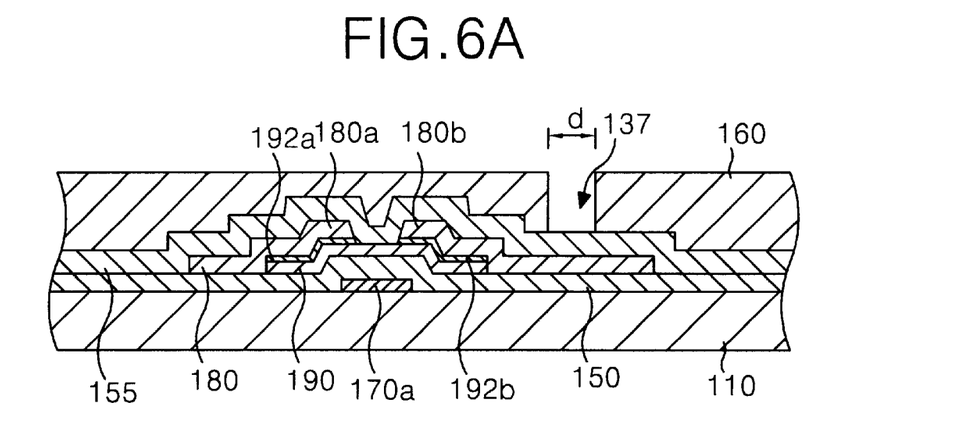
FIGS. 6A–6C are cross sectional views illustrating the manufacturing steps for a liquid crystal display device according to the present invention.
Figure 6B:
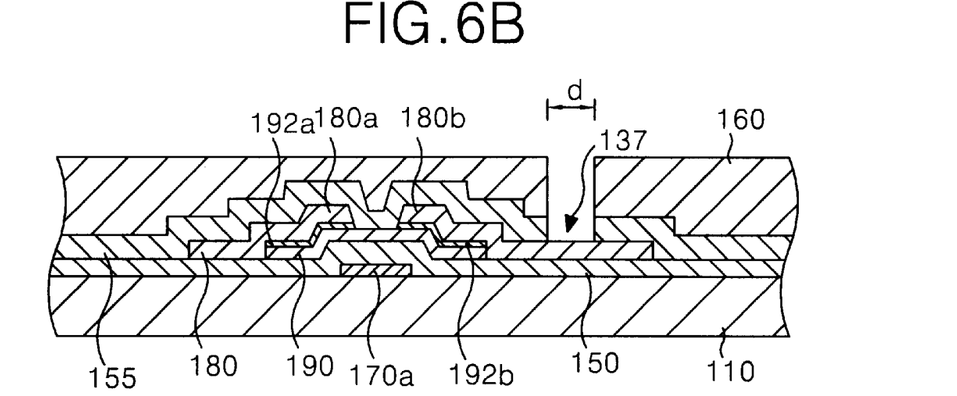
Figure 6C:
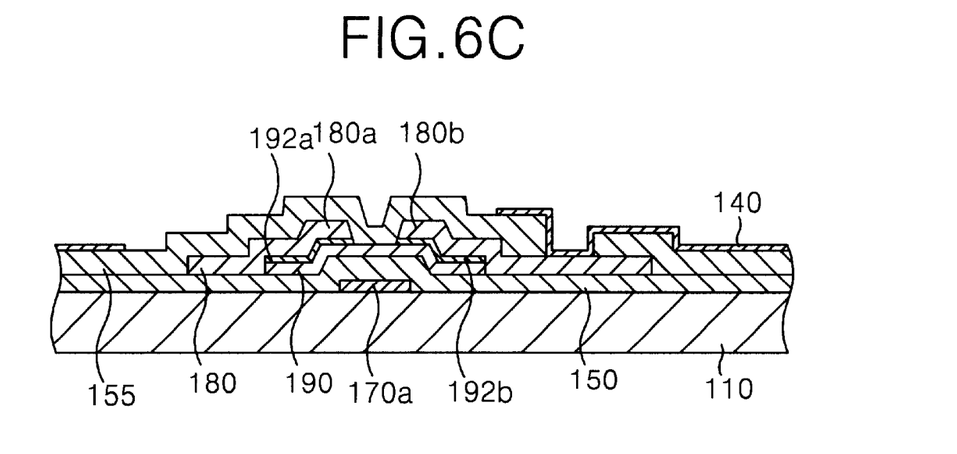

FIG. 6A illustrates the display area having a gate electrode 170a extruding from the gate line 170 including aluminum formed on the transparent substrate 110. A gate insulation layer 150 including an inorganic material such as a silicon nitride or a silicon oxide is deposited on the gate line 170 and the gate electrode 170a. A semiconductor layer 190 including intrinsic amorphous silicon is formed on the gate insulation layer 150 over the gate electrode 170a. Two doped semiconductor layers 192a and 192b which include an impurity doped amorphous silicon are formed on the two sides of the semiconductor layer 190. The source electrode 180a and the drain electrode 180b are formed on the doped semiconductor layers 192a and 192b, respectively, in ohmic contact with them. The source electrode 180a is connected to the data line 180 disposed on the gate insulation layer 150. After the TFT 131 is completely formed, the protection layer 155, intruding an inorganic material such as a silicon nitride or a silicon oxide, or an organic material such as a BCB, is formed on the whole surface of the substrate including the display area 120 and the non-display area 130. A photoresist is coated on the whole surface of the substrate. The photoresist is exposed by an ultra violet light using a mask having a predetermined pattern for forming the contact hole 137. The photoresist is developed to form a pattern layer 160 according to the mask. For example, the contact hole 137 pattern has a rectangular shape of which scale of the side, d, is about several μm. Therefore, the whole area of the contact hole is under 1% of the whole surface area of the substrate.

On the other hand, the non-display area 130, as seen in FIG. 7A, comprises a metal layer 180 which is the same material as the drain electrode 1 80b on the substrate 110. The protection layer 155 also covers the metal layer 180, like at the display area. While the photo resist covering the whole surface of the substrate 110 is patterned at the display area to form the contact hole 137 pattern, the etching end point detection part 500 at the non-isplay area is simultaneously patterned. The pattern layer 160 at the display area comprises the contact hole 137 pattern and the pattern layer 160 at the nondisplay area comprises the etching end point detection part 500 pattern. As an example, the pattern of the etching end point detection part 500 is of a rectangular shape of which scale of the side, D, is about several cm. Therefore, the area of the etching end point detection part is about 1% to 2% of the whole surface area of the substrate.

The LCD panel having a pattern layer 160, as shown in FIGS. 6a and 7a, is placed in an etching chamber. An etchant such as a $SF_6$ gas or a $CF_4$ gas is injected into the chamber. Then, the exposed portions of the protection layer 155 through the contact hole 137 pattern at the display area and the etching end point detection area 500 pattern at the non-display area start to be removed from the surface by reacting with the etchant. When the protection layer 155 is etched, a volatile material such as a $SiF_4$ is reproduced by the reacting the Si radical of the protection layer 155 and the F radical of the $SF_6$ or $CF_4$ gases.

Figure 9:
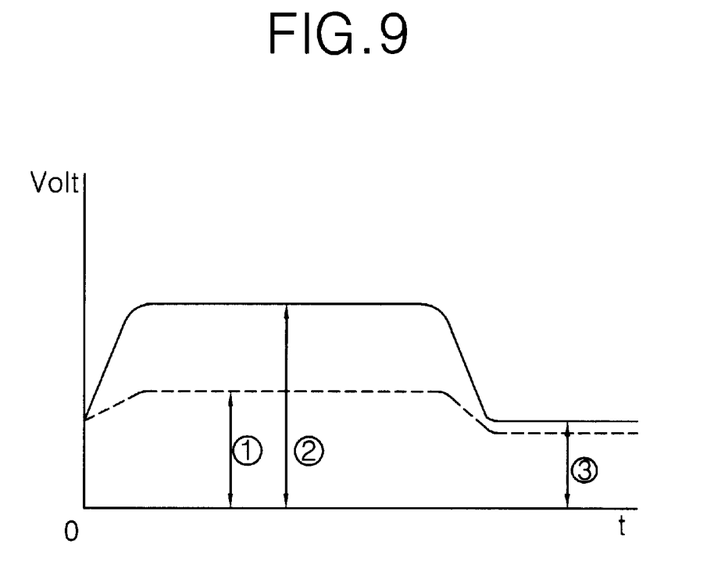
FIG. 9 is a voltage-time graph in which the etching end point is detected according to the present invention.

In order to determine the etching end point, the amount of the $SiF_4$ produced is detected using the etching end point detector which is utilized in the conventional method discussed previously. As seen in FIG. 9, the time-voltage graph for detecting the amount of the $SiF_4$ gas, the voltage (2) is high while the etching process is proceeding and the voltage (2) is remarkably reduced when the protection layer is removed. When we compare the two graphs, in which the dashed line is the graph of the conventional method and the solid line is the graph of the present invention, the changed portion of the graph in the present invention is more easily distinguished than in the conventional method because of the greater difference between voltage levels between time (2) and time (3). As a result, the exact desired etching end point may be detected. Because the protection layer 155 preferably has a uniform thickness at the display and non-display areas, the etching process of the etching end point detection part 500 proceeds at the same rate as the etching process of the contact hole 137. After the etching process is finished using the etching end point detector, the shape of the LCD panel is like the FIG. 6B, showing the contact hole 137 formed in the display area, and FIG. 7B, showing the etching end point detection part 500 formed in the non-display area As we have seen, the contact hole 137 does not become over-etched but has the exact size as originally designed.

After the etching is accomplished, the pattern layer 160 is removed using a solvent including a N-Methal-Pyrrolidone, an alcohol and an amine. An indium tin oxide layer is deposited on the protection layer 155 having the contact hole 137. The ITO layer is patterned to form the pixel electrode 140 connecting to the drain electrode 180b through the contact hole 137. Because the contact hole 137 has not been over-etched, the pixel electrode 140 covers the contact hole 137. Hence, no portion of the drain electrode 180b is exposed since it is covered by the pixel electrode 140, as seen in FIG. 6C.

The shape of the etching end point detection part is not limited to a rectangular shape. Moreover, it is preferable that a plurality of etching point detection parts are provided. If the total area of the etching end point detection part is about 1% to 2% of the total area of the substrate, then there is no limitation of the shapes and numbers of such parts provided.

The non-display area 130 preferably includes a removed portion 130a which is cut out after the LCD panel is finally produced and a non-removed portion 130b which includes a plurality of pads 270 which are connected to the gate line 170 (or data line 180), as seen in FIG. 8. The etching end point detection part 500 can be disposed in the removed portion 130a or in the non-removed portion 130b. Alternatively, the etching end point detection part 500 can be disposed both in the removed portion 130a and in the non-removed portion 130b.

In this embodiment, the etching process for forming the contact hole has been described. However, the scope of the present invention can expanded to other etching processes. For example, when a metal layer deposited on an inorganic or an organic layer is patterned, the etching end portion detection part can be designed at some portion of the metal layer. This arrangement differs from previously described arrangements at least in that the gas detected by the etching end point detector is a different gas because that the etched material is a metal and the etchant is a different material such as a $BCl_3$ or a $Cl_2$.

The present invention thus suggests a method for performing an etching process in which the etching duration end point is exactly detected. The present invention teaches a method for manufacturing a liquid crystal display device as well as a method for detecting an etching end point in a manufacturing method of a device, each method respectively including the steps of forming a first layer on a substrate; forming a second layer on the first layer; and patterning an etching end point detection area in the second layer in accordance with a designed pattern including an etching end point detection part until the first layer is exposed through the etching end point detection area; wherein the substrate comprises a first portion which is cut out after the device manufacturing is completed and a second portion which remains after the device manufacturing is completed; and wherein the etching end point detection area is disposed in at least one of the first and second portions. More particularly, the present invention utilizes a protection layer etching end point detection part at a non-display area while a contact hole is being formed. The amount of a reproducing gas produced from the reacting etchant and the protection layer is more abundant when the etching process is proceeding using this method than in conventional methods in which no such etching end point detection part is utilized. As a result, the etching end point can be exactly detected and no over-etching of a layer will occur. This increases the production yield of manufactured devices such as an LCD.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for manufacturing a liquid crystal display device having a substrate separated into a display area and a non-display area, comprising the steps of:

forming a first layer on the substrate;

forming a second layer on the first layer and covering both the display area and the non-display area;

coating a photoresist layer over the second layer;

exposing the photoresist layer to an ultraviolet light using a mask having a predetermined pattern for forming a hole at the display area and an etching end point detection part at the non-display area;

developing the photoresist layer to form a pattern layer having a first pattern at the display area and an etching end point detection part pattern at the non-display area in accordance with the mask;

injecting all etchant that reacts with portions of the second layer that are exposed through the first pattern and the etching end point detection part pattern to commence a removal of these exposed portions of the second layer resulting in the generation of a reproducing gas; and automatically detecting an etching end point by detecting the amount of the reproducing gas generated at both the display area and the non-display area.

2. A method for manufacturing a liquid crystal display device according to claim 1, wherein the first layer is a metal layer and the second layer includes an Si bonding structure.

3. A method for manufacturing a liquid crystal display device according to claim 2, wherein the second layer includes an organic material such as a benzocyclobutene.

4. A method for manufacturing a liquid crystal display device according to claim 2, wherein the second layer includes an inorganic material such as a selected one of a silicon nitride and a silicon oxide.

5. A method for manufacturing a liquid crystal display device according to claim 2, wherein said etchant is a selected one of $SF_6$ and $CF_4$.

6. A method for manufacturing a liquid crystal display device according to claim 1, wherein the first layer includes one of an organic material and an inorganic material, and the second layer is a metal layer.

7. A method for manufacturing a liquid crystal display device according to claim 6, wherein said etchant is one of $BCl_3$ and $Cl_2$.

8. A method for manufacturing a liquid crystal display device according to claim 1, wherein a plurality of etching end point detection parts are utilized.

9. A method for manufacturing a liquid crystal display device according to claim 1, wherein the total area of the etching end point detection part is about 1% to 2% of the area of the whole surface of the substrate.

10. A method for manufacturing a device having a substrate separated into a first portion and a second portion, comprising the steps of:

forming a first layer on the substrate;

forming a second layer on the first layer and covering both the first and second portions;

coating a photoresist layer over the second layer;

exposing the photoresist layer to an ultraviolet light using a mask having a predetermined pattern for forming a hole at the first portion and an etching end point detection part at the second portion;

developing the photoresist layer to form a pattern layer having a first pattern at the first portion and an etching end point detection part pattern at the second portion in accordance with the mask;

injecting an etchant that reacts with portions of the second layer that are exposed through the first pattern and the etching end point detection part pattern to commence a removal of these exposed portions of the second layer resulting in the generation of a reproducing gas;

automatically detecting an etching end point by detecting the amount of the reproducing gas generated at both the first portion and the second portion of the substrate; and cutting out the second portion of the substrate after the device manufacturing is completed so that only the first portion remains in the finished device.

11. A method for manufacturing a device according to claim 10, wherein the first layer is a metal layer and the second layer includes an Si bonding structure.

* * * * *